US010523086B2

(12) United States Patent
Dion et al.

(10) Patent No.: US 10,523,086 B2
(45) Date of Patent: Dec. 31, 2019

(54) ACTUATOR HAVING REDUCED DIMENSIONS AND INTEGRATED LOCKING OF THE MOTOR WITH RESPECT TO THE HOUSING

(71) Applicant: Valeo Systemes Thermiques, Le Mesnil Saint Denis (FR)

(72) Inventors: Nathalie Dion, Le Mesnil Saint-Denis (FR); Philippe Kerg, Le Mesnil Saint-Denis (FR); Sébastien Colinet, Le Mesnil Saint-Denis (FR); Morgan Le Goff, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 222 days.

(21) Appl. No.: 15/534,134

(22) PCT Filed: Nov. 24, 2015

(86) PCT No.: PCT/EP2015/077458
§ 371 (c)(1),
(2) Date: Jun. 8, 2017

(87) PCT Pub. No.: WO2016/091580
PCT Pub. Date: Jun. 16, 2016

(65) Prior Publication Data
US 2019/0097495 A1   Mar. 28, 2019

(30) Foreign Application Priority Data
Dec. 11, 2014   (FR) ...................................... 14 62250

(51) Int. Cl.
*H02K 7/116*   (2006.01)
*F16H 1/28*   (2006.01)
(Continued)

(52) U.S. Cl.
CPC ............... *H02K 7/116* (2013.01); *F16H 1/28* (2013.01); *F16H 57/02* (2013.01); *H02K 37/24* (2013.01);
(Continued)

(58) Field of Classification Search
CPC . H02K 7/116; H02K 7/10; H02K 5/04; H02K 5/15; H02K 5/22; H02K 37/24;
(Continued)

(56) References Cited

U.S. PATENT DOCUMENTS 6,437,470 B1 *   8/2002   Hsu .......................... B62M 6/65
                                                           310/67 A
2009/0189468 A1 *   7/2009   Kume .................... H02K 1/148
                                                              310/83

FOREIGN PATENT DOCUMENTS

DE   102008030006 A1 *   12/2009   ............... F16H 1/46
DE   102008030006 A1     12/2009
(Continued)

OTHER PUBLICATIONS

Machine translation of DE-102008030006-A1. (Year: 2009).*
(Continued)

*Primary Examiner* — Michael Andrews
(74) *Attorney, Agent, or Firm* — Osha Liang LLP

(57) ABSTRACT

The invention relates to an actuator (1) for positioning an aeraulic flap, including a housing (10) containing an electric motor (30) surrounded by a shell (31) which is rigidly connected to a stator (33) of the motor (30) and which has one end closed by a cover (35), from which protrudes an output shaft (34) of the motor, the output shaft (34) being rotatably coupled to an input stage of an epicyclic reduction gear (50) having an external ring gear (52), the cover (35) including means (41) for locking said cover against rotation with respect to the shell (31), and said locking means (41)
(Continued)

being arranged so as to also lock the external ring gear (52) against rotation with respect to the shell (31) of the electric motor (30).

8 Claims, 8 Drawing Sheets

(51) Int. Cl.
*F16H 57/02* (2012.01)
*H02K 37/24* (2006.01)
(52) U.S. Cl.
CPC .............. *F16H 2057/02034* (2013.01); *F16H 2057/02082* (2013.01)
(58) Field of Classification Search
CPC .. F16H 1/28; F16H 57/02; F16H 2057/02082; F16H 2057/02034
USPC ......................................................... 310/83
See application file for complete search history.

(56) References Cited

FOREIGN PATENT DOCUMENTS

| JP | S40-30893 Y1 | | 10/1965 |
|---|---|---|---|
| JP | 2007-159237 A | | 6/2007 |
| JP | 2007159237 A | * | 6/2007 |
| WO | 2013/120704 A1 | | 8/2013 |

OTHER PUBLICATIONS

Machine translation of JP-2007159237-A. (Year: 2007).*
International Search Report issued in corresponding application No. PCT/EP2015/077458 dated Jun. 23, 2016 (4 pages).
Written Opinion of the International Searching Authority issued in corresponding application No. PCT/EP2015/077458 dated Jun. 23, 2016 (5 pages).

* cited by examiner

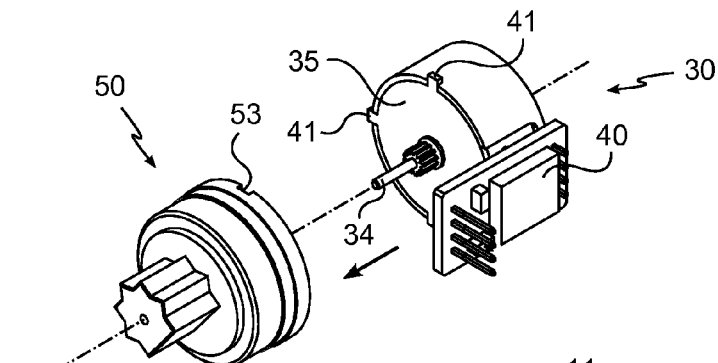
Fig. 8.1
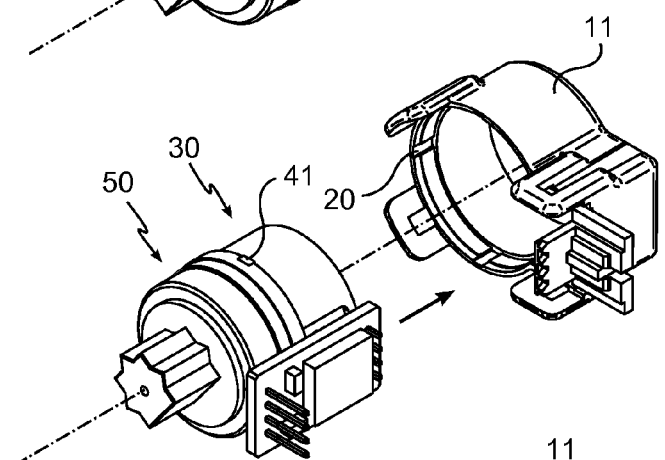
Fig. 8.2
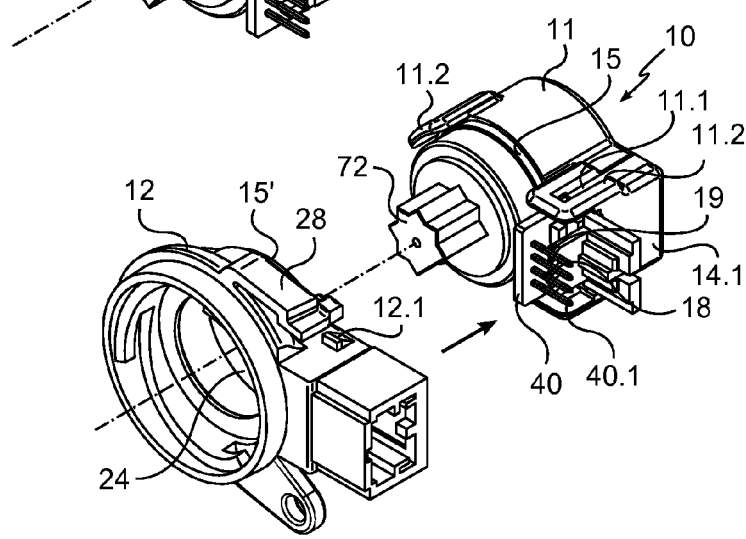
Fig. 8.3
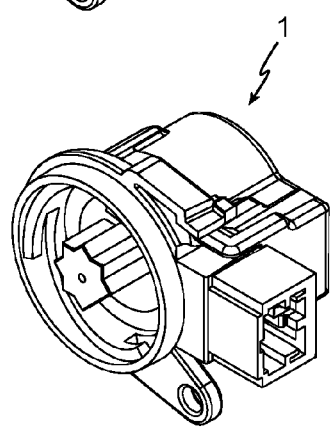
Fig. 8.4

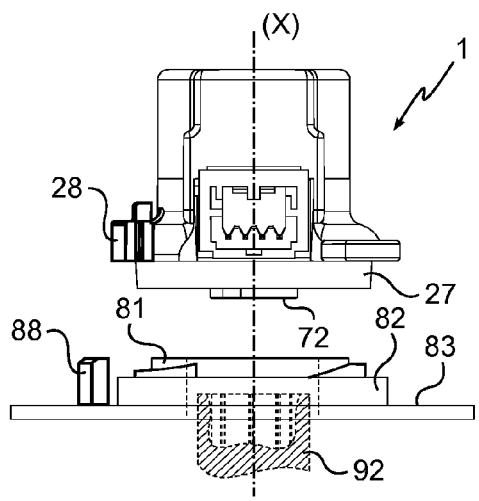
Fig. 11.1
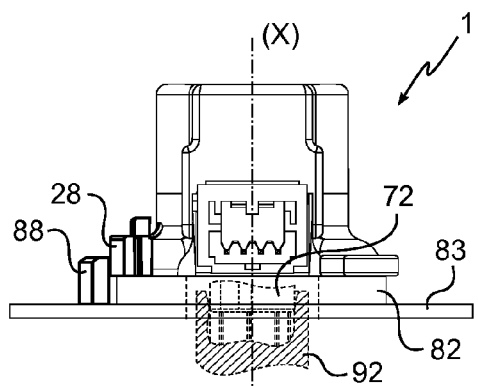
Fig. 11.2
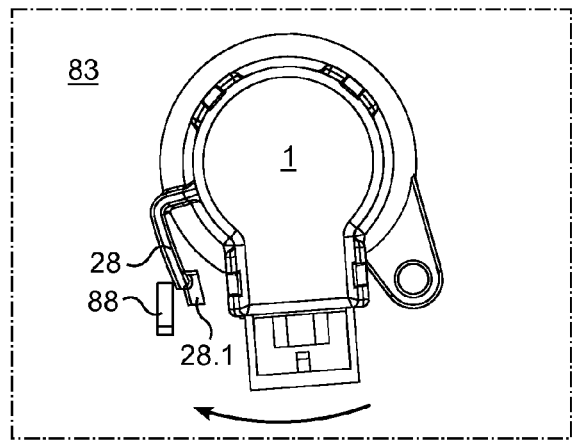
Fig. 11.3
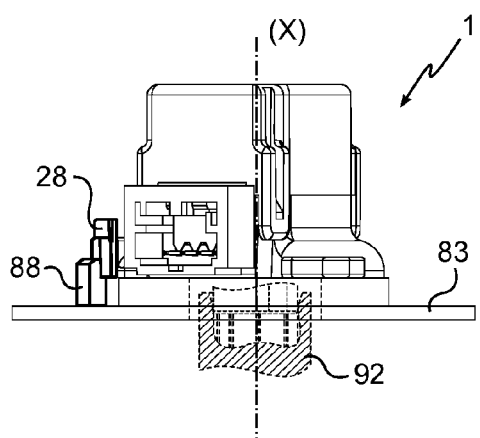
Fig. 11.4
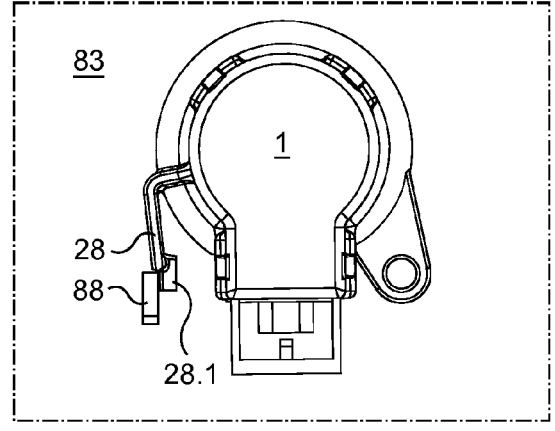
Fig. 11.5

ACTUATOR HAVING REDUCED DIMENSIONS AND INTEGRATED LOCKING OF THE MOTOR WITH RESPECT TO THE HOUSING

FIELD OF THE INVENTION

The present invention relates to the field of aeraulics and more particularly to the field of actuators for moving parts, in particular for vehicles, such as, for example, air distribution flaps in the heating, ventilation and air conditioning systems. Such circuits are notably present in the air conditioning installations of vehicles.

BACKGROUND OF THE INVENTION

A large portion of vehicles are now equipped with air conditioning devices, regardless of the type of motorization of the vehicle. Conventionally, such a device comprises an air conditioning unit driven by the engine of the vehicle or by a dedicated electric motor, as well as elements for recovering heat from the engine of the vehicle (in the case of an internal combustion engine) or generally electric heating elements. An air flow drawn from inside the car interior or from outside the vehicle is directed through a heat exchanger allowing calories to be added to or taken away from this air flow. The heated or cooled air flow is then directed to various outlet points of the vehicle through a network of air distribution ducts. In order to direct the air flow, mix hot and cold air, switch from a heating system to a cooling system, or regulate the flow rate of the airflow at each of the outlet points, air flaps placed at various points in the network of air distribution ducts. The position of these air flaps is generally controlled by electromechanical actuators.

Usually, such an actuator comprises an electric motor whose drive shaft is provided with a worm screw. This worm gear meshes with the first toothed wheel of a gear train transmitting, to within one gear ratio, the rotation of the drive shaft to an output component of the actuator. The output component, generally a toothed wheel, a splined shaft or any other connector capable of transmitting a rotation, interacts with a homologous component integral with a rotational axis of the air flap.

Such an actuator is packaged in a parallelepiped housing resulting from the assembly of two half-housings which each comprise bearings that guide in rotation the shafts of the toothed wheels of the gear train. The output component of the actuator protrudes from one of the faces of the housing, in a direction perpendicular to that of the output shaft of the electric motor. The housing also comprises means for locking the electric motor in rotation, often performed by means of plane surfaces bearing on flats made on the casing of the motor. This requires special machining.

Such an actuator has several disadvantages, notably regarding production cost, overall dimensions and ease of assembly.

In addition, the housing must be provided with means for counteracting its rotation with respect to the support of the flap, which is generally achieved by means of screws passing through the housing so as to bite into the plastic material of the flap support.

SUBJECT OF THE INVENTION

A purpose of the invention is to reduce the dimensions of the actuator and the costs associated with its manufacture and assembly.

SUMMARY OF THE INVENTION

To this end, a positioning actuator of a movable member is provided, notably for a vehicle, comprising an electric motor (30) housed in a motor casing closed at one end by a cover, the motor comprising a drive shaft that passes through the cover, the drive shaft being rotationally connected to an epicyclic reduction gear having an external ring gear, the cover (35) comprising locking means blocking the rotation of said cover with respect to the casing of the motor and blocking the rotation of said external ring gear.

Locking the reduction gear in rotation with respect to the motor is thus ensured by the cover which is an integral part of the casing of the motor, which facilitates the assembly of these two elements during the manufacture of the actuator and reduces the costs. The use of an epicyclic reduction gear enhances the compactness of the actuator and also reduces its manufacturing costs.

Advantageously, the locking means is arranged to also block the motor casing in rotation with respect to the housing.

This arrangement facilitates the assembly of the actuator elements with one another and reduces the manufacturing times and costs of the actuator.

Further advantageously, the drive shaft extending along a longitudinal axis, the locking means also guide the cover into position with respect to the casing in a longitudinal direction.

The use of the same means to lock the cover in rotation and guide it into position in relation to the casing also reduces the manufacturing times and costs of the actuator.

According to a particular embodiment, the locking means comprises at least one element projecting from the cover in a direction perpendicular to the axis of the drive shaft.

According to another embodiment, the electric motor is a stepping motor and the locking means also comprise an indexing reference of the motor making it possible to index the rotation of the motor with respect to a point on the casing.

This makes it possible to take advantage of the calibration operation of the motor during its manufacture and avoids having to perform a final calibration operation of the actuator.

Other characteristics and advantages of the invention will become apparent on reading the following description of particular non-limiting embodiments of the invention.

BRIEF DESCRIPTION OF DRAWINGS

Reference will be made to the accompanying drawings, wherein:

FIGS. 8.1 to 8.4 are perspective representations of the assembly steps of the actuator of FIG. 1;

FIGS. 11.1 to 11.5 are perspective representations of the steps of assembling the actuator of FIG. 1 onto the connector of FIG. 10.

DETAILED DESCRIPTION OF THE INVENTION

Figure 1:
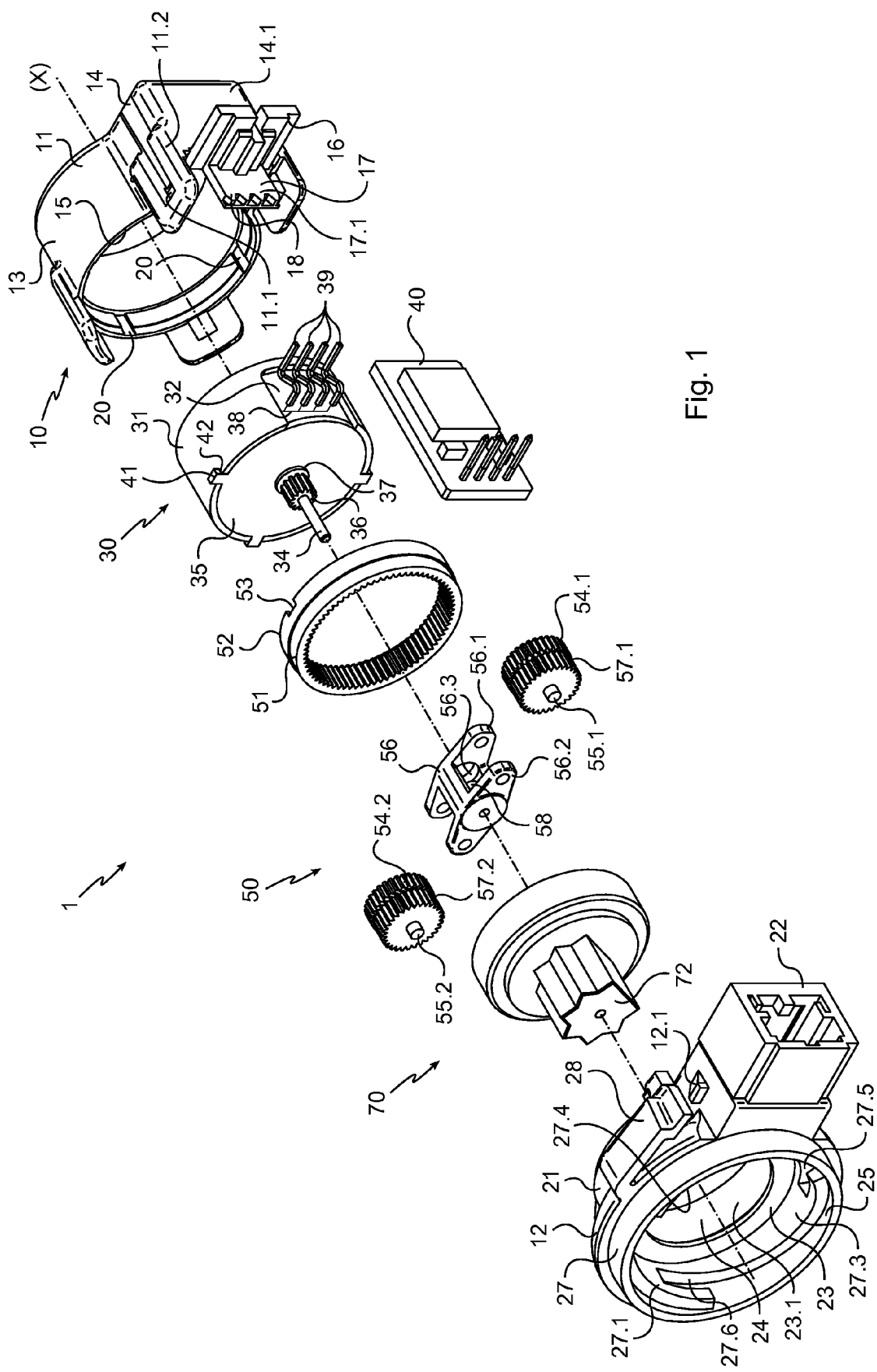
FIG. 1 is an exploded perspective view of an embodiment of an actuator according to the invention.

With reference to FIGS. 1 to 7, the actuator according to the invention, generally designated 1, is mounted in a vehicle (not shown) and comprises a housing 10 enclosing an electric motor 30, for example an electric stepping motor, connected to a two-stage epicyclic reduction gear 50, an output component 70 of which is connected in rotation to a movable member, for example an air flap (not shown) of a motor vehicle.

The housing 10 comprises a first half-housing 11 and a second half-housing 12 connected to each other. According to a particular embodiment, the connection is made by snap-fitting four lugs 12.1 of the second half-housing 12 into corresponding openings 11.1 made in tabs 11.2 projecting from the first half-housing 11. However, other modes of joining may be used. The first half-housing 11 extends at least partially around the motor 30 while the second half-housing 12 comprises an opening 24 through which the output component 70 extends.

The motor 30 is housed in a cylindrical casing 31. According to an exemplary embodiment, this cylindrical casing 31 is integral with the stator 32 of the motor 30. The stator 32 is composed, for example, of a series of copper windings surrounding a rotor 33 of which at least one drive shaft 34 of the motor 30 is integral.

The drive shaft 34 extends along a longitudinal X-axis of the actuator 1 projecting from a cover 35 extending perpendicularly to the longitudinal X-axis and closing one end of the casing 31. In other words, the drive shaft passes through the cover along the longitudinal X-axis of the actuator 1.

According to an embodiment, a toothed wheel 36 is integral with the drive shaft 34. This toothed wheel 36 is located on the portion of the output shaft 34 located near the cover 35.

According to a particular embodiment, a washer 37 made of lubricating material, such as Teflon, is interposed between the base of the toothed wheel 36 and the cover 35, the drive shaft 34 extending significantly beyond the face of the toothed wheel 36 opposite to that in contact with the washer 37.

Figure 2:
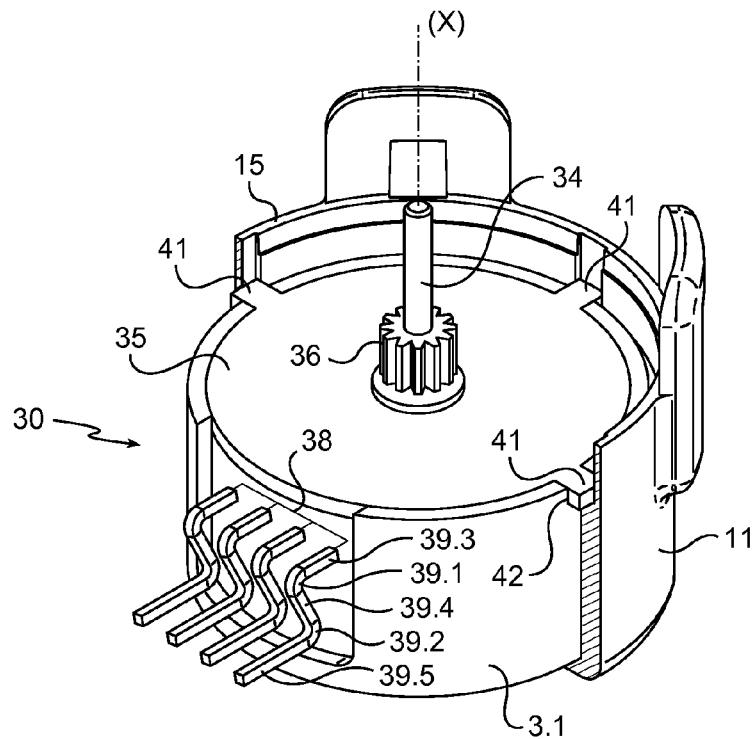
FIG. 2 is a perspective view of the motor of the actuator of FIG. 1 wherein the housing is partially represented.

As can be seen in FIG. 2, the electrical circuit 38 of the electric motor 30 is connected to at least one conductor. According to a particular embodiment, the electrical circuit 38 is connected to at least 2 conductors, preferably four identical conductors 39, parallel to one another.

This/these conductor(s) is/are substantially "S" shaped, each having at least one elbow. According to a particular embodiment, this/these conductor(s) has/have at least two elbows 39.1 and 39.2. In the description that follows, only one of the conductors 39 will be described, as the other conductors are identical.

In the particular embodiment wherein the conductor has two elbows, the elbow 39.1 connects a first end section 39.3 of the conductor 39, connected to the electrical circuit 38, to an intermediate section 39.4 which is itself connected by the elbow 39.2 to the second end section 39.5 of the conductor. The first and second end sections 39.3 and 39.5 are parallel to one another and extend perpendicularly to the X-axis of rotation of the drive shaft 34 while being non-collinear.

The second end section 39.5 of the conductor 39 is connected to a first end of an electronic board 40. According to an exemplary embodiment, the electronic board 40 extends in a plane parallel to the X-axis.

The second end of the board 40 comprises at least one conductor 40.1.

Figure 3:
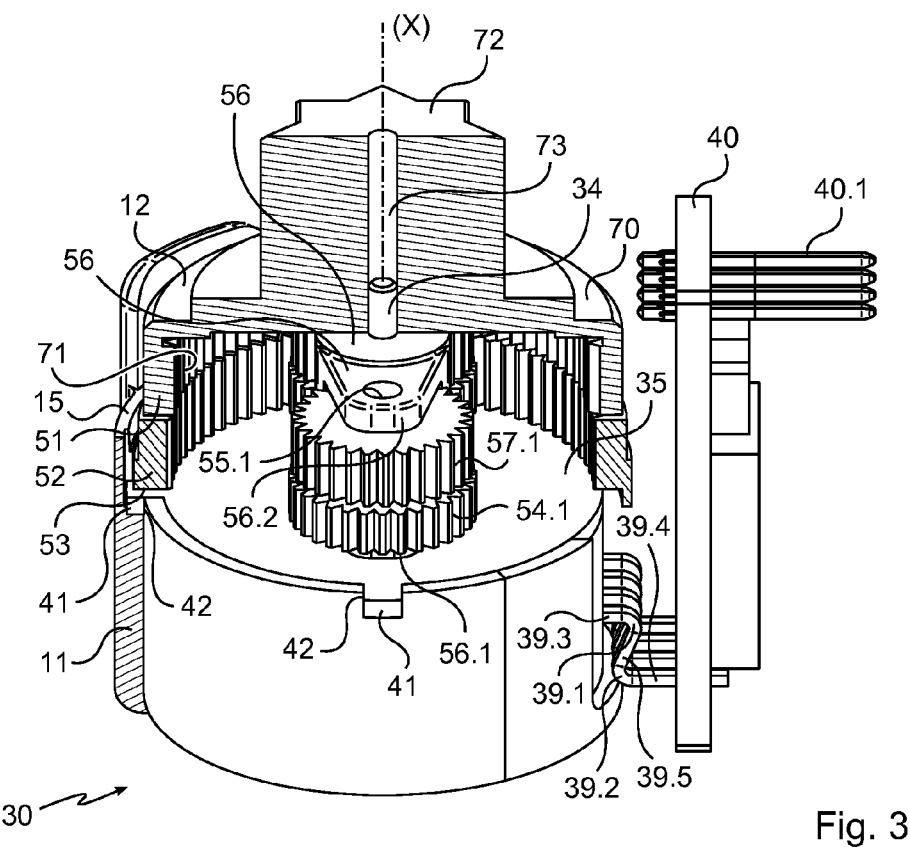
FIG. 3 is a partial sectional perspective view of the motor and reduction gear of the actuator of FIG. 1.
Figure 4:
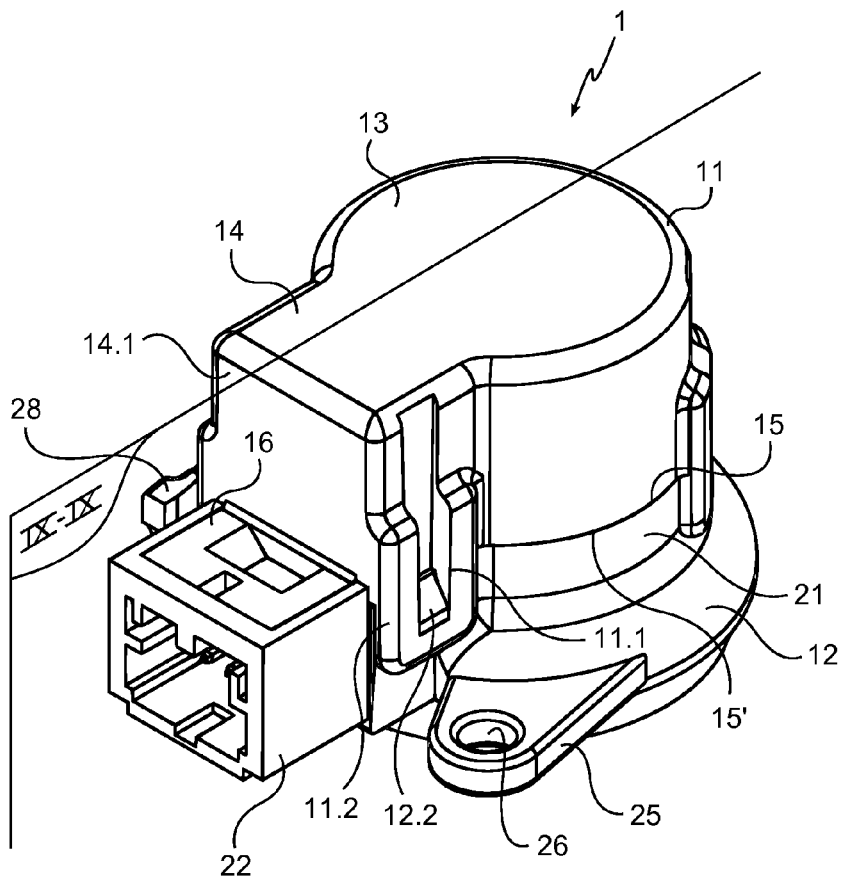
FIG. 4 is a perspective view of the actuator of FIG. 1.

According to the embodiment illustrated in FIG. 3, the second end of the board 40 comprises four conductors 40.1 extending parallel to the sections 39.3 and 39.5.

This/these conductor(s) 40.1 is/are intended to be connected to a low voltage network of the vehicle 100. This/these conductor(s) 40.1 is/are made of steel wire. According to an embodiment, this steel wire has a square cross-section of width l'.

For the purpose of the present application, the term "elbow" designates a change of direction of an elongated element resulting from bending or folding, the elbow being able to have a rounded or pointed profile.

The conductor 39 is made by bending a metal wire—for example a steel wire—the square cross-section of which has one side of length l. Preferably, the minimum length of the sections 39.3, 39.4 and 39.5 is substantially equal to 2 mm. The successive sections 39.3 and 39.4 extend along directions preferably forming an angle of 70° between them. The directions of the successive sections 39.4 and 39.5 also form an angle of 70° between them.

Note that the electrical conductors 39 are sufficiently rigid so that soldering can be readily automated. The elbows provide good compactness of the conductor, a flexibility that allows the vibration of the motor and its environment to be absorbed, and flexibility to accommodate wider manufacturing and assembly tolerances, thereby reducing manufacturing costs. Furthermore, the cost of the conductors 39 is less than that of a flexible conductor. In addition, owing to the elbows 39.1, 39.2, the end sections 39.1, 39.2 are offset with respect to one another. It is therefore possible to mount electronic components on either side of the portion of the electronic board 40 next to the end sections 39.5 and facing the elbow 39.1 and the intermediate section 39.3.

As can be seen in FIGS. 1 to 3, the cover 35 is disc-shaped and extends in a plane perpendicular to the X-axis. However, the cover may be of a different shape. The cover 35 comprises at least one tab 41 projecting radially from the disk.

According to the example illustrated in FIG. 2, the cover 35 comprises a plurality of tabs 41 projecting radially from the disk and which extend in various directions, for example perpendicular to one another.

Each tab 41 cooperates with a homologous groove 42 of the casing 31. The tab(s) 41 has/have a length greater than the thickness of the casing 31 and therefore project from the latter when the cover 35 closes the casing 31.

The external ring gear 51 of the first stage of the epicyclic reduction gear train 50 has a lower face which rests on the cover 35. The ring gear 51 comprises a skirt 52 projecting axially and which surrounds the upper portion of the outer surface of the casing 31. This skirt 52 comprises at least one open notch 53 into which a projecting tab portion 41 projecting from the casing 31 engages.

According to a particular embodiment, the skirt 52 comprises a plurality of open notches 53 into which the portions of the tabs 41 projecting from the casing 31 engage.

This assembly blocks the ring gear 51 in rotation with respect to the casing 31. The length of the tab(s) 41 is such that they have portions radially projecting from the skirt 52.

The first stage of the epicyclic reduction gear train 50 comprises one or more planet gears 54.1 and 54.2 meshing with the ring gear 51 and with the toothed wheel 36 which acts as an inner planet gear. The planet gears 54.1 and 54.2 are keyed on shafts 55.1 and 55.2, respectively, which extend between two parallel lugs 56.1 and 56.2 of a planet gear carrier 56. One or more planet gears 57.1 and 57.2 of the second stage 57 of the epicyclic reduction gear 50 are also keyed on the shafts 55.1 and 55.2, respectively. These planet gears 57.1 and 57.2 each comprise one tooth less than the planet gears 54.1 and 54.2 and mesh with an external planetary toothed wheel 71 integral with the output component 70.

The lug 56.1 comprises a circular opening 56.3 at its center through which the toothed wheel 36 and the drive shaft 34 extend. As can be seen in FIG. 3, the drive shaft 34 of the motor 30 extends along the X-axis through a central cylinder 58 integral with the lug 56.2. This connection between the drive shaft 34 and the planet gear carrier 56 then guides the planet gear carrier 56 in rotation about the X-axis.

The output component 70 comprises a protruding portion, in the form of a splined shaft 72 of axis X for example, intended to cooperate with a splined bore 92 homologous to the air flap 90. The splined shaft 72 comprises a central bore 73 of axis X through which the drive shaft 34 partially extends.

The housing 10 will now be described in greater detail with reference to FIGS. 1 to 7.

According to an embodiment, the half-housing 11 comprises a cylindrical portion 13 having a closed end, projecting radially from which a parallelepiped portion 14 extends. The portions 13 and 14 are flush with a junction plane 15 with the half-housing 12.

The half-housing 11 comprises a tab 16 projecting radially from a surface 14.1 of the parallelepiped portion 14. A second tab 17, located in the same plane as the surface 14.1, projects axially from the plane 15. This tab 17 comprises a distal end 17.1 provided with one or more triangular teeth 18 at the top of which is a flat 19 whose width is substantially equal to the length l' of one side of the cross-section of the conductors 40.1. The inside surface of the cylindrical portion 13 of the half-housing 11 comprises one or more grooves 20 extending parallel to the X-axis and forming one or more openings.

According to a particular embodiment, the inside surface of the cylindrical portion 13 of the half-housing 11 comprises three grooves 20 located at 90 degrees from one other. This/these groove(s) 20 open/opens at the junction plane 15.

The half-housing 12 comprises a cylindrical portion 21 projecting radially from which a tubular parallelepiped portion 22 extends. The portions 21 and 22 are flush with a junction plane 15' with the half-housing 11 and have an opening at this end.

A disk 23, with a diameter greater than that of the cylindrical portion 21 and provided with a central bore 24 intended to allow the splined shaft pass through 72, extends transversely and closes the first cylindrical portion 21. The disc 23 also comprises a lug 25 projecting radially from the disc 23 and is provided with a hole 26. A cylindrical wall 27 of axis X extends at the periphery of the disk 23 in the region which is delimited by the plane of the disk 23 which is opposite to that into which the cylindrical portion 21 extends.

A resilient tab 28 projects from the external surface of the cylindrical wall 27 along a substantially tangential direction so as to create a deformable mechanical obstacle forming a rotation stop. The inside surface of the wall 27 comprises one or more helical threads 27.1, 27.2 and 27.3.

According to a particular embodiment, the inside surface of the wall 27 comprises three helical threads, the overlapping portions of which define grooves 27.4, 27.5 and 27.6.

Figure 5:
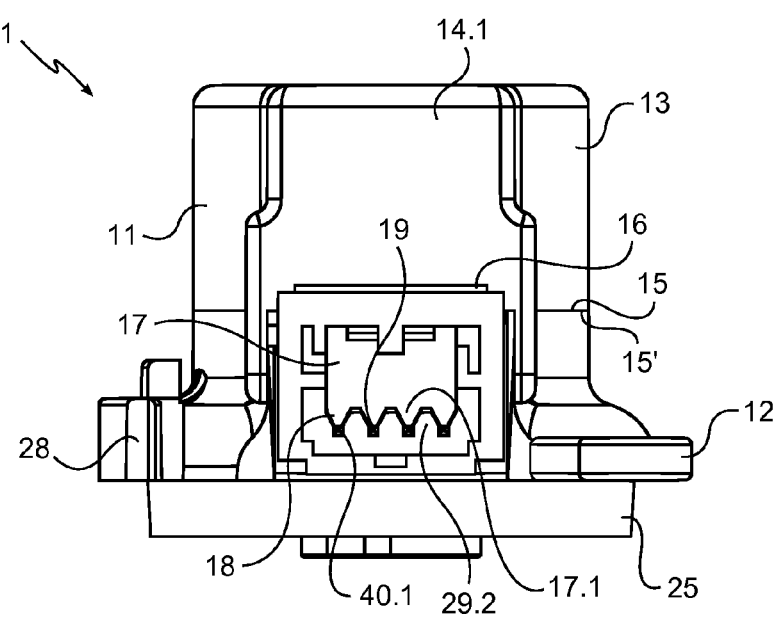
FIG. 5 is a side view of the actuator of FIG. 4.
Figure 6:
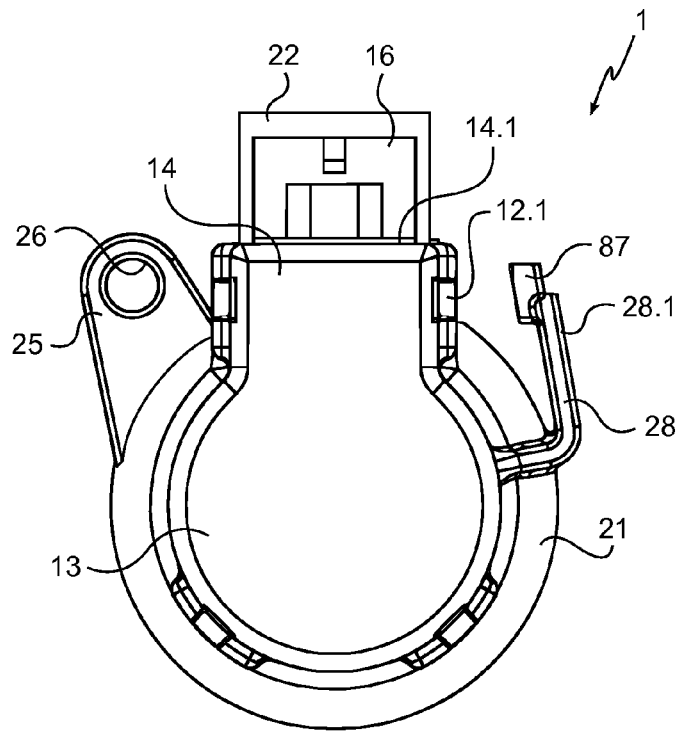
FIG. 6 is a top view of the actuator of FIG. 4.
Figure 7:
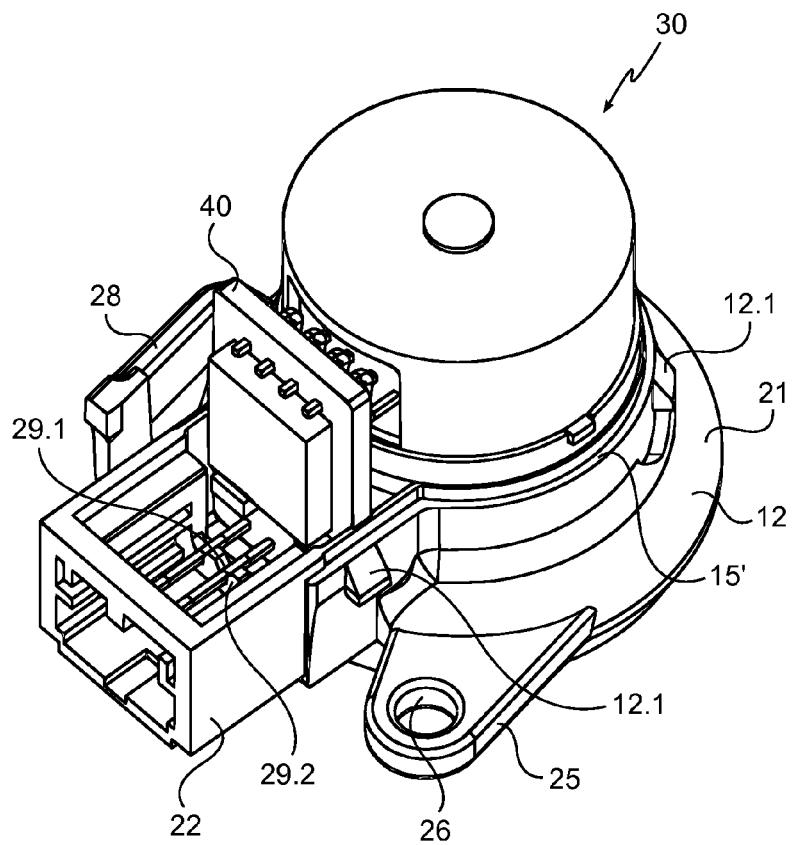
FIG. 7 is a view identical to that of FIG. 4 wherein the upper part of the housing has been removed.
Figure 9:
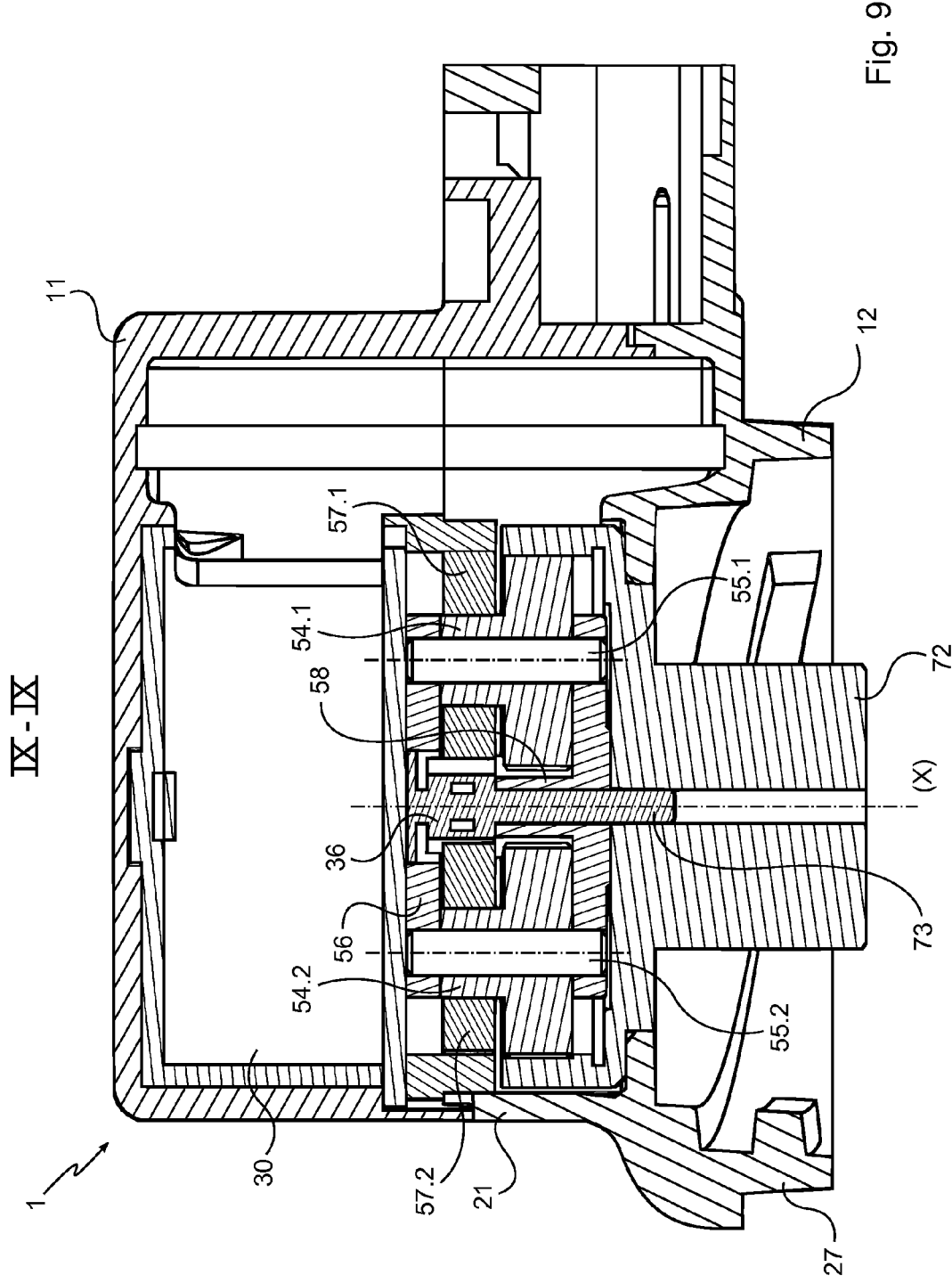
FIG. 9 is a sectional view of the actuator according to a plane IX-IX of FIG. 4.

Finally, as can be seen in FIGS. 5 and 7, the bottom of the parallelepiped portion 22 comprises one or more square slots 29.1 having a side substantially equal to l.

According to a particular embodiment, the bottom of the parallelepiped portion 22 comprises four square slots which are separated by three triangular teeth 29.2.

The parallelepiped portion 22 also includes a surface provided with a cutout having one or more grooves and one or more protruding portions. This cutout is intended to receive and retain a specific electrical connector.

The manufacture of the actuator 1 is described with reference to FIGS. 8.1 to 8.4.

During its manufacture, the motor 30 is indexed in relation to one of the tabs 41 of the cover 35. The rotation reference of the motor 30 is then taken from this tab 41. The conductor(s) 39 is/are soldered to the board 40.

As shown in FIG. 8.1, the epicyclic reduction gear 50 is presented in front of the drive shaft 34 and is displaced so that the drive shaft 34 engages in the central bore of the cylinder 58 and then through the bore 73 of the output component 70. The drive shaft, extending beyond the toothed wheel constituting the input component engaging in the bores, allows relative guidance of the epicyclic reduction gear 70 and the output component 70 with respect to the motor 30 during assembly and thereby reduce the assembly time.

In addition, the guidance of the planet gear carrier in rotation by the output shaft of the motor advantageously makes it possible to reduce the assembly difficulties and time of the planet gear carrier and to render the guidance more reliable, thereby improving the overall reliability of the actuator.

The ring gear 51 is then rotated until the groove(s) 53 line(s) up facing the tab(s) 41 and then the epicyclic reduction gear 50 is moved in a direction parallel to the X-axis so that the tab(s) 41 is/are engaged in the grooves 53. The epicyclic reduction gear 50 is then locked in rotation with respect to the motor 30.

The assembly, consisting of the motor 30 and the epicyclic reduction gear 50, is presented facing the half-housing 11 so that the groove(s) 20 of the half-housing 11 are facing the tabs 41 of the cover 35.

The motor 30/epicyclic reduction gear 50 assembly is then moved in a direction parallel to the X-axis so that the tab(s) 41 is/are engaged into the grooves 20 (FIG. 8.2).

The engagement of the tab(s) 41 in the grooves 20 blocks the motor 30/epicyclic reduction gear 50 assembly in rotation with respect to the half-housing 11.

In this position, the conductor(s) 40.1 rest(s) on the flat surface(s) 19 of the triangular teeth 18 (FIG. 8.3) and the periphery of the electronic board 40 is received in the groove(s) made in the walls of the parallelepiped portion 14.1 of the half-housing 11.

The half-housing 12 is then presented so that the splined shaft 72 faces the bore 24 and so that the openings 11.1 of the tabs 11.2 are aligned with the lugs 12.1. A translation along the X-axis of the half-housing 12 with respect to the half-housing 11/motor 30/epicyclic reduction gear assembly then brings the respective junction planes 15 and 15' of the half-housings 11 and 12 into contact.

According to a particular embodiment, lugs 12.1 click into the openings 11.1 of the tabs 11.2 and complete the assembly of the actuator 1.

When the half-housings 11 and 12 are assembled, the conductor(s) 40.1 is/are received in the slots 29.1 and pinched between the bottom of the latter and the flats 19 of the teeth 18 (FIG. 5). This ensures that the conductor(s) 40.1 is/are efficiently held in position and reduces the mechanical stresses on the welds connecting the conductors 40.1 to the electronic board 40. The relative positioning of the conductor(s) 40.1 is guaranteed, thus avoiding the use of overmolded end pieces.

During the assembly of the elements of the actuator 1, the indexing reference of the motor is maintained. It corresponds to one of the tabs 41, whose position with respect to the housing 10 is determined. It is thus not necessary recalibrate the motor 30, which represents a significant advantage over the actuators of the prior art.

Figure 10:
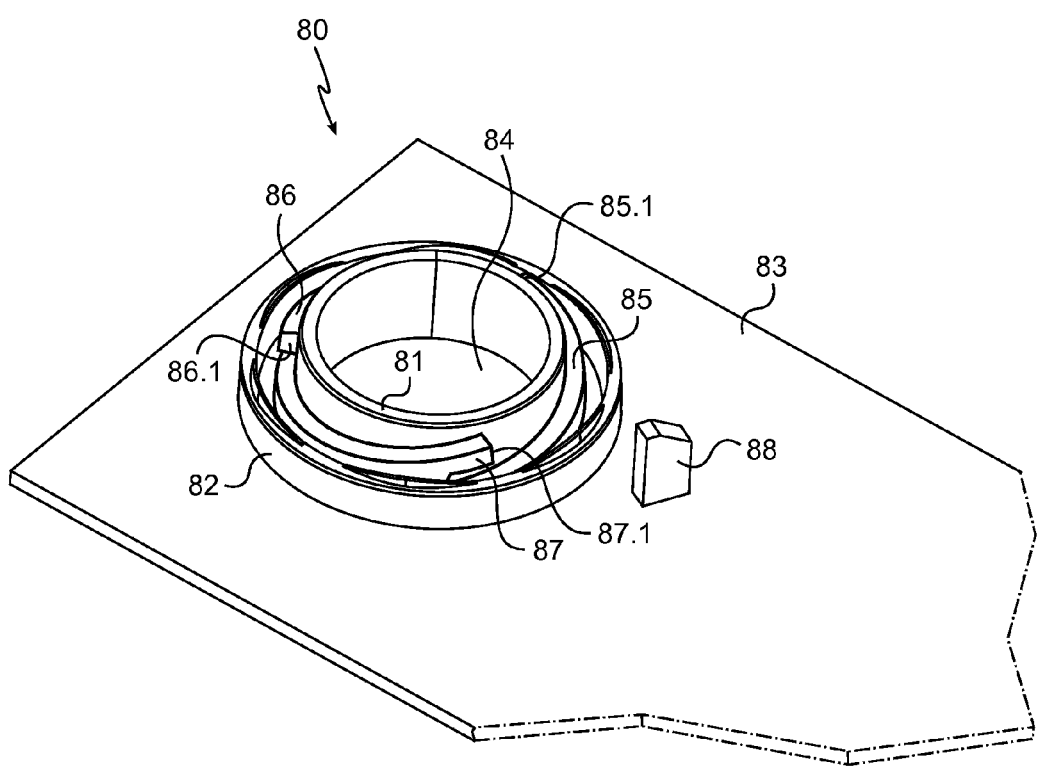
FIG. 10 is a perspective view of a connector designed to receive the actuator of FIG. 1.

FIG. 10 shows a connector 80 for connecting the actuator 1 to a device, for example an air flap (not shown) of a ventilation system. This connector 80 comprises two coaxial cylindrical walls 81 and 82 projecting perpendicularly to a plane portion of the outer face of a lid 83 of the aeraulic circuit. The wall 81 borders a bore 84 behind which is a splined bore 92 (shown in dotted lines, in particular in FIG. 11.1) integral in rotation with the axis of rotation of the air flap. The wall 82 extends around the wall 81. One or more helical threads 85, 86 and 87 project radially from the outside face of the wall 81 and have a free end portion 85.1, 86.1 and 87.1, respectively.

The outside surface of the lid 83 also comprises a parallelepiped lug 87 protruding in a direction substantially perpendicular to the plane of the planar portion of the lid 83.

The assembly of the actuator 1 on the connector 80 is described with reference to FIGS. 11.1 to 11.5. The actuator 1 is presented so as to be coaxial with the bore 84 (FIG. 11.1). In this position, the splined shaft 72 faces the splined bore 92. The actuator 1 is then moved along the X-axis so as to insert the wall 27 of the housing 10 between the two cylindrical portions 81 and 82. The translational movement of the actuator 1 is carried out until the free end portions 85.1, 86.1 and 87.1 of the helical threads 27.1, 27.2 and 27.3 of the housing 10 of the actuator 1 come into contact with the helical threads 85, 86 and 87 of the connector 80 (FIG. 11.2). The actuator 1 is then rotated about the X-axis clockwise so as to engage the helical threads 27.1, 27.2 and 27.3 with the homologous threads 85, 86 and 87.

During this rotational movement of the actuator 1, the free end 28.1 of the resilient tab 28 comes into contact with the lug 88. This situation is represented in FIG. 11.3 and corresponds to a rotation of the actuator 1 with respect to the lug 88 by approximately 15 to 30° in the clockwise direction. An additional rotation of the actuator 1 with respect to the connector 80, causes the resilient tab 28 to be deformed against the lug 88. This rotational movement continues until the free end portions 85.1, 86.1 and 87.1 are engaged in the grooves 27.4, 27.5 and 27.6, respectively (FIG. 11.4). This corresponds to a maximum rotation of approximately 30° of the actuator 1 about the X-axis in the clockwise direction. In this relative position of the actuator 1 and of the connector 80, the resilient tab 28 returns to position and the free end 28.1 comes to rest behind the lug 88, thus blocking the rotation of the actuator 1 in relation to the connector 80. The actuator 1 is then locked in position on the connector 80 and the splined shaft 72 of the actuator 1 is engaged in the splined bore 92 of the air flap. The electrical connection of the actuator 1 to the low voltage network of the vehicle is achieved by engaging a connection pin on the conductor(s) 40.1.

After electrical disconnection, the actuator 1 is removed by exerting pressure in a substantially radial direction on the end 28.1 of the resilient tab 28 in order to disengage it from the lug 88. In order to be able to disengage it, one them simply has to impose a rotation of 60° in the anticlockwise direction to the actuator 1. In the event that the resilient tab 28 or of the lug 88 breaks accidentally, it is possible, when the actuator 1 is being reassembled, to immobilize the actuator 1 in rotation in relation to the cover 83 by engaging a self-tapping screw in the hole 26 of the lug 25. This screw will then engage into the material constituting the cover 83.

The actuator 1 can thus easily be assembled and disassembled without requiring tools. As the motor 30 is indexed with reference to a point on the housing 10 of the actuator 1, and the final position thereof with respect to the air flap 90 being known, no complementary calibration operation is required.

It should be noted that locking the reduction gear in rotation with respect to the motor is thus ensured by the cover which is an integral part of the casing of the motor, which facilitates the assembly of these two elements during the manufacture of the actuator and thereby reduces the costs. The use of an epicyclic reduction gear enhances the compactness of the actuator and also reduces its manufacturing costs.

Of course, the invention is not limited to the embodiment described but encompasses any variant within the scope of the invention as defined by the claims. In particular:

- although here the electric motor is a stepping motor, the invention also applies to other types of motor such as a DC motor, for example;
- although here the epicyclic reduction gear is a two-stage reduction gear, the invention also applies to other epicyclic reduction gears such as, for example, a single-stage epicyclic reduction gear or with three or more stages;
- although here the second stage of the epicyclic reduction gear comprises planet gears linked in rotation with the planet gears of the first stage, the invention also applies to other types of two-stage epicyclic reduction gears such as, for example, a reduction gear comprising a second stage wherein the planet gears of the second stage are mounted to rotate freely on the planet gear carrier and mesh with a central pinion integral with the planet gear carrier and with an external ring gear of the second stage;
- although here the actuator comprises a single output component, the invention also applies to an actuator having a plurality of output components, enabling simultaneous movement of a plurality of air flaps;
- although here the two half-housings are assembled by snap-fastening, the invention also applies to other means of assembly such as screwing, gluing, welding or broaching, for example;
- although here the electrical circuit of the motor is connected to four conductors, the invention also applies to a motor connected to a single conductor, or a plurality of conductors;
- although the actuator has been described with an electronic board built into the housing, the actuator may be devoid of an electronic board, or the electronic board may be external to the housing;
- although here the teeth of the parallelepiped portions of the half-housings are triangular in shape, the invention also applies to other shapes of teeth such as square, rounded or any shape whatsoever, for example;

although here the resilient tab extends from the cylindrical wall of the half-housing in a substantially tangential direction, the invention also applies to other orientations of the resilient tab such as, for example, an orientation in a direction forming an angle of approximately 0 to 45° with a radius passing through the point of connection of the resilient tab to the cylindrical wall;

although here the gearing of the planet gears of the first and second stages of the epicyclic reduction gear are different by one single tooth, the invention also applies to planet gears of the first and second stages differing from each other by a greater number of teeth such as 2 or more;

although here the planet gears are keyed on their axes of rotation, the invention applies to other means of assembling in rotation such as molding, gluing, shrink-fitting or a spline connection, for example;

although here the lug intended to lock the resilient lug is of parallelepiped shape, the invention also applies to other types of lugs, such as, a lug of cylindrical or non-cylindrical shape, for example;

although here the resilient tab enters into contact with the lug after a 45° rotation of the actuator with respect to the connector and the actuator is locked after a 60° rotation, the invention also applies to situations in which the lug enters into contact and locks the actuator on the connector corresponding to other rotation angle values of the actuator with respect to the connector.

The invention claimed is:

1. A positioning actuator of a movable member for a vehicle, comprising:
    an electric motor housed in a motor casing closed at one end by a cover, the motor comprising:
        a drive shaft that passes through the cover, the drive shaft being rotationally connected to an epicyclic reduction gear having an external ring gear,
    wherein the cover comprises locking means blocking the rotation of said cover with respect to the casing of the motor, and
    wherein the locking means cooperates with an open notch in the external ring gear to block the rotation of said external ring gear with respect to the casing of the motor.

2. The actuator as claimed in claim 1, wherein the locking means are arranged to also block the casing of the electric motor in rotation with respect to the motor casing.

3. The actuator as claimed in claim 1, wherein the drive shaft extends along a longitudinal axis, the locking means also guides the cover in position with respect to the casing along a longitudinal direction.

4. The actuator according to claim 1, wherein the locking means comprises at least one element projecting from the cover in a direction perpendicular to the axis of the drive shaft.

5. The actuator according to claim 1, wherein the electric motor is a stepping motor.

6. An actuator according to claim 5, wherein the locking also comprises an indexing reference of the electric motor for indexing the rotation of the electric motor with respect to a point of the casing.

7. The actuator according to claim 1, wherein the casing comprises a straight cylinder portion, and the cover is a disc extending in a plane perpendicular to an axis of the drive shaft, the disc comprising three tabs projecting radially extending in directions perpendicular to each other and cooperating with homologous grooves of the casing.

8. The actuator according to claim 1, wherein the electric motor is provided with an electric circuit connected to a conductor having a first substantially straight end section and a second distal end section, the conductor having at least two elbows connecting the end sections to each other, and wherein a drive shaft of the electric motor is provided with a gear wheel constituting the input component of the epicyclic reduction gear, the output shaft extending at least partially through an output component of the epicyclic reduction gear.

* * * * *